(12) United States Patent
Colussi et al.

(10) Patent No.: US 6,325,124 B1
(45) Date of Patent: Dec. 4, 2001

(54) PNEUMATIC ROTARY WHEEL COUPLING

(75) Inventors: Rafael A. Colussi; Nēstor J. Vénica, both of Santa Fe (AR)

(73) Assignee: Col-Ven S.A., Santa Fe (AR)

( * ) Notice: Subject to any disclaimer, the term of this patent is extended or adjusted under 35 U.S.C. 154(b) by 0 days.

(21) Appl. No.: 09/497,249

(22) Filed: Feb. 3, 2000

(51) Int. Cl.$^7$ .......................... B60C 23/10; B60C 29/00; B60C 29/06
(52) U.S. Cl. .......................... 152/417; 152/415; 152/427
(58) Field of Search .................. 152/415, 416, 152/417 I, 427, 428, 429

(56) References Cited

U.S. PATENT DOCUMENTS

| | | | |
|---|---|---|---|
| 3,037,544 | * 6/1962 | Gouirand | 152/415 |
| 3,838,717 | * 10/1974 | Wolf | 152/415 |
| 5,240,039 | 8/1993 | Colussi et al. . | |
| 5,377,736 | * 1/1995 | Stech | 152/415 |
| 5,538,062 | * 7/1996 | Stech | 152/415 |
| 5,584,949 | * 12/1996 | Ingram | 152/417 |
| 5,762,732 | * 6/1998 | Chapman | 152/415 |
| 6,105,645 | * 8/2000 | Ingram | 152/415 |
| 6,145,559 | * 11/2000 | Ingram, II | 152/417 |

FOREIGN PATENT DOCUMENTS

716087 * 4/1931 (FR) ....................... 152/417

* cited by examiner

*Primary Examiner*—S. Joseph Morano
*Assistant Examiner*—Jason R. Bellinger
(74) *Attorney, Agent, or Firm*—Davidson, Davidson & Kappel, LLC

(57) ABSTRACT

A pneumatic rotary coupling (25) for an air pressure installation for one or more wheels of a vehicle, in which the wheel's axle (11) is used as the section of the pipe of the static installation, in accordance to the system of the coupling used. The coupling's stem (49) has one end formed in the shape of a nozzle which extends in the plane of the wheel, disposed as an axial extension of the wheel's axle end. The stem is located rotatable and slidable inside block (35) which is fixed to the wheel's hub cover. A cover (37) fixed to the block presents a cavity (45) with an edge that defines a seat for a plastic bushing (47) that supports the coupling's stem. The external surface of this bushing is conformed by grooves (53) that communicate the cavity towards the orifices linking with the tires. One method allows for the detection of bearing faults using the same coupling when the axial sliding of the stem is sufficient to vent the pressurized air.

11 Claims, 2 Drawing Sheets

PNEUMATIC ROTARY WHEEL COUPLING

FIELD OF THE INVENTION

The present invention relates to rotary couplings for mounting on wheels of a motorized vehicle to communicate the pressurized air of the tires with a pneumatic system installed inside the vehicle to control and calibrate the pressure of the tires, compensating eventually for slight leaks by supplying air from a compressed air source, typically a compressor system. These couplings provide the pneumatically sealed connection between the installation considered as static and the rotary part, which as well can be affected by other relative movements such as vibrations.

The present invention also concerns a method to detect wear and tear in wheel bearings to prevent catastrophic faults on the wheel mounting at the end of the vehicle's axle.

BRIEF DESCRIPTION OF THE PRIOR ART

In large and medium-sized vehicles, either passenger or cargo, it is of particular importance to control the pressure of the tires whilst on the road, due to the serious consequences an accident, caused by a flat tire, may bring upon when travelling at high speed and/or when other vehicles are on the road. For some years now it is standard to install pneumatic control and pressure compensating systems in these vehicles, that make use of the onboard compressor of the brake system to correct deficiencies detected in the air pressure of the tires. To this purpose, the referred system includes an air pipe connected to the tire intake valves.

The use of rotary couplings in these pipes is known to solve the sealing between the wheel's rotary movement and the chassis or vehicle's fixed parts. The static installation conventionally includes a pipe section fixed to the vehicle's body, typically the mudguard, that is linked axially to the external end of the rotary coupling attached to the wheel's hub. Argentine patent No. 231,948 and patent application Ser. No. 316,897 disclose rotary couplings in which the air connection with the static part is carried out on the external end of the coupling's stem or rotor. The term "external" is used herein in relation to the vehicle's chassis or body, that is the connection is arranged on the outer side of the wheel.

This system is of relative simplicity and does not affect the mounting of the wheel on the axle's end. But it suffers from the drawback of exposing the sealed connection and coupling to knocks that may occur against road curbs or other hard objects or from damages due to slight accidents with things or other vehicles, that may render useless the system on the wheel in question. The system is susceptible to vehicle's vibrations whilst in motion, the movement of the axle's suspension relative to the body, the outdoor weather conditions, the air friction that subjects the system to mechanical and dynamic thermal forces of magnitude and varied oscillations that may limit the useful life of the system, as it is exposed for example in Argentine patent P970105,633.

Also known in the art is the "Meritor" system from Pressure Systems International, Inc., U.S. Pat. No. 5,584, 949, which makes use of the hollow axle that most North American and European automobile brands use for mounting the wheels, continuing the air pipe inside the vehicle's axle and arranging an inward axial end connection to the rotor's stem. This system has the advantage of not exposing the pipe and rotary coupling as in the other case but presents other drawbacks, such as small air leaks that build up excessive pressure on the wheel's bearing mountings at the end of the vehicle's axle. This excessive pressure deteriorates the bearing seals and pushes the lubricant grease out of them, diminishing its useful life. This situation worsens when the rotary coupling's seals are worn out, which is generally detected only after some time when the leakage is of certain magnitude, forcing the vehicle's bearings to run dry and eventually break down.

As it happens, none of these systems allow one to diagnose substantial wear of bearings, enough to produce wheel misalignments and uncentring relative to its axle, increasing the tire's wear and the fuel consumption, and could lead to a fault in the vehicle's axle end. This is of particular importance in the referred "Meritor" system, as it does not provide any form of detecting faults in the bearing of which is part cause of.

SUMMARY OF THE INVENTION

The present invention not only solves the problem of the loss of lubrication in the wheel's bearings due to excessive pressure from the rotary coupling, but as well enables one to diagnose a shift in the bearings position, due to wearing, breakage or fault of one of its components.

An object of the invention is a pneumatic coupling for one or more wheels located on the vehicle's axle end, wherein the vehicle's axle is used for the pipe section of the static installation connected to the rotary coupling, the stem of the coupling being directed inwards into the vehicle's axle.

Another object of the invention is to avoid exposing the wheel's bearings to excessive air-pressures coming from the coupling.

A further object of the invention is to provide a method that allows the detection of certain faults of some magnitude in the wheel's bearings by means of the same rotary coupling of the invention herein.

To attain these and other objects and advantages, a pneumatic coupling is provided that encompasses a body that is mounted to the wheel and inside of which a pressurized air cavity is formed, linked through one or more orifices in the body with the wheel's tubes. In the case of axles with two or more wheels, the body may have as many orifices linking with the tube's inside as tires to control. The body holds a rotatable stem traversed axially by a conduit that leads into a cavity and a rotatable seal to avoid, under normal functional conditions, pressurized air from leaking from the cavity through the interstitial gap between the stem and the body. According to the invention, the coupling's stem has an end that projects from the body to the wheel's plane provided with a nozzle or a connecting device to an air passage that runs inside the vehicle's axle to communicate the tire through the conduit with the air pressure control device. In a convenient form, the connecting device is placed as an axial extension of the vehicle's axle end. As well, in the body of the coupling, a vent orifice is provided to depressurize the side of the seal opposite to the cavity, to protect the wheel's bearings.

In the preferred embodiment, the body encompasses a block provided with means for attachment to the wheel's hub and a cover attached to the block and which presents a cup portion whose edge defines a seat for a plastic bushing that supports the internal end of the coupling's stem. The external surface of this bushing includes grooves that communicate the cavity with the orifice that links with the wheel's tire. The bushing may be formed by a circumferential skirt supporting a main seal placed upon a washer with radial open grooves directed towards the airing orifice to maintain the opposite side of the seal to the cavity depressurized.

According to an interesting accessory feature of the invention, the coupling's stem is mounted with some axial play inside said body, enough to displace the end that leads into the cavity at the other side of the seal. It has been found that this mounting enables monitoring a shift or misalignment of certain magnitude of the wheel's bearings, due to wear or breakage, by detection on a panel of the controlling device of a pressurized air leakage provided by the pipe to the coupling by means of the airing orifice.

BRIEF DESCRIPTION OF THE DRAWINGS

These and other characteristics and details of the object of this invention and the manner it can be developed, implemented and put into practice may be better understood with the following detailed description of an example embodiment illustrated in the attached drawings, in which.

PREFERRED EMBODIMENT OF THE INVENTION

Figure 1:
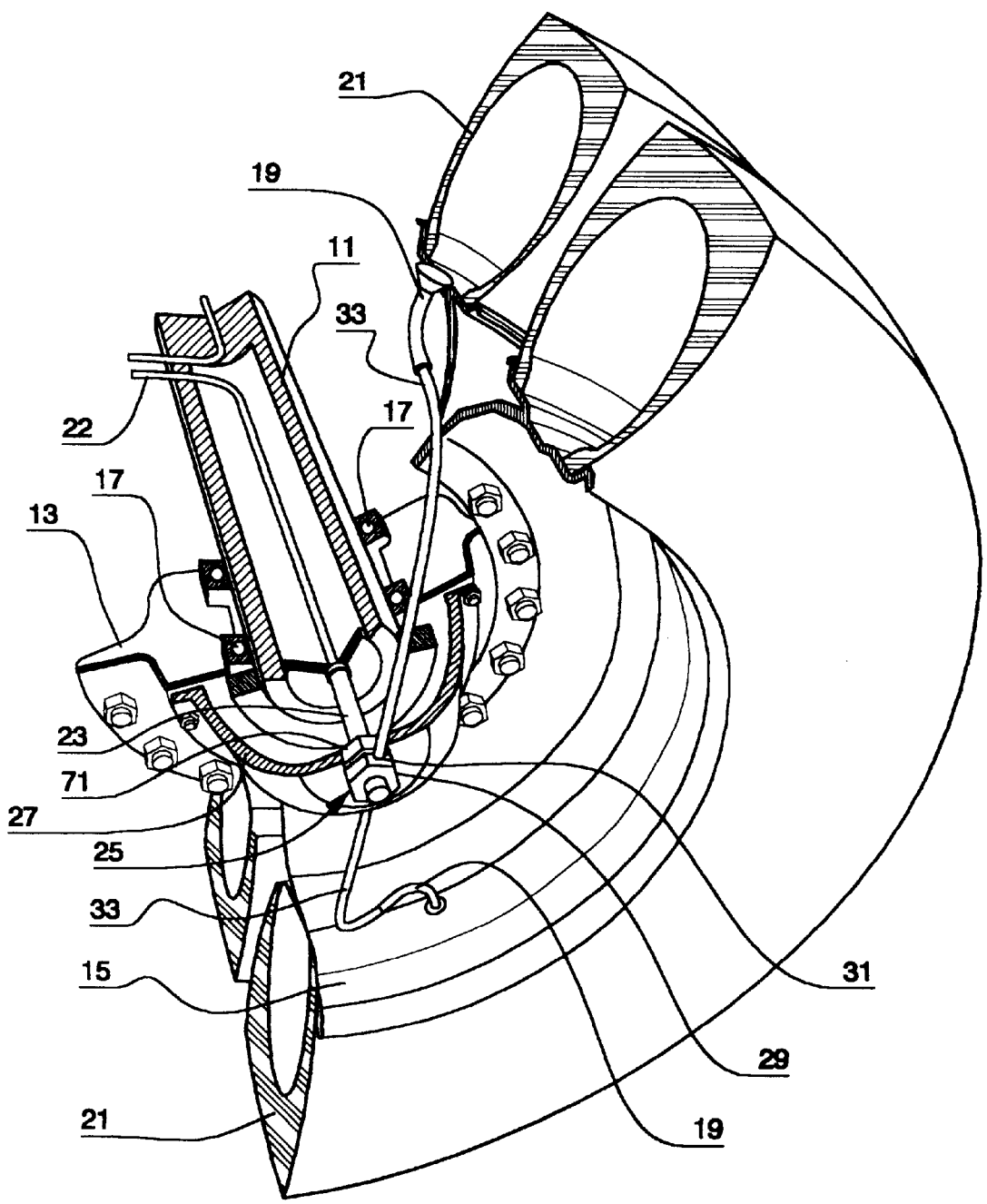
FIG. 1 is a schematic, partly in perspective and partly in section, showing the rotary coupling's mounting according to one embodiment of the present invention.

In FIG. 1, the end of axle 11 of a motor vehicle, such as in a truck, a trailer or a large bus, is shown. A wheel's hub 13 for mounting a double tire 15 is mounted on the end of axle 11 by means of a pair of bearings 17. A nozzle 19 passes a connection to the wheel's tube 21.

The pressurized air pipe 22 enters the hollow axle 11 and extends towards the end where the wheel is mounted, where a flexible rubber and cloth pipe section 23 connects it axially to the rotary coupling 25 of the present invention, which is mounted on the wheel's hub cover 27 that protects the bearings 17. In FIG. 1, the body 29 of the coupling 25 can be seen. Two orifices 31 which connect by means of the respective hose sections 33 to the nozzles 19 of the tubes 21 are shown. The coupling 25 provides a continuous sealed communication between the pipe 22 and the nozzles 19, thereby bridging the relative movement between the tires due to the wheel's rotation. The pair of orifice 31 and section 33 are placed radially opposite each other for a better dynamic balance of the wheels.

Figure 2:
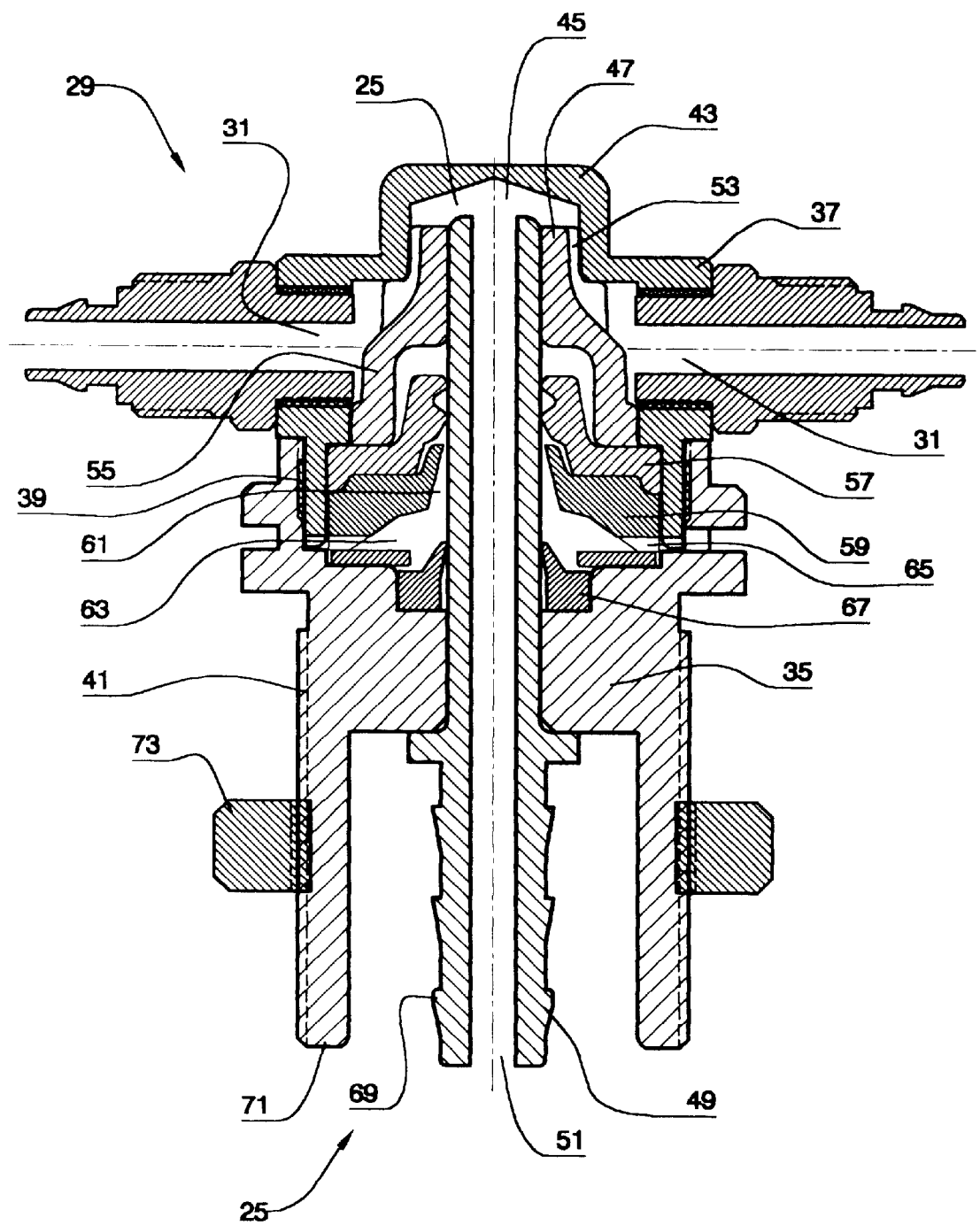
FIG. 2 is a cross-section view of the rotary coupling according to a preferred embodiment of the present invention and which forms part of the set of FIG. 1.

FIG. 2 details a preferred construction of the coupling 25. The coupling 25 consists of a body formed by a block 35 and a cover 37 fixed to the block 35 by means of a thread 39. The block 35 presents a second external thread 41 for the wheel's hub cover 27. The cover 37 has the orifices 31 which communicate to the tire tubes 21. The cover 37 comprises as well a cup shaped portion 43 the interior of which defines the cavity 45 and the cup edge forming a seat for a plastic bushing 47 for the rotary mounting of stem 49.

Stem 49 is traversed longitudinally by a conduit 51, which leads to the cavity 45. The passage of air continues from this cavity 45 towards the orifices 31 by means of axial grooves 53 formed on the lateral surface of the bushing 47.

The bushing 47 continues inwards with a skirt 55 that supports a main seal 57 that bears against a plastic washer 59. The seal 57 is of a double lipped type to resist the full tire air pressure. The seal may be of the type disclosed in patent application No. 327,649. The washer 59 has radial grooves 61 that communicate any air excess pressure that reaches the seal 57 to a gap 63 from where it can be released through opening 65.

A secondary seal 67 blocks the passage of extraneous bodies to the wheel's bearings 17. This seal 67 is of the "V-RING" type with one lip which gives way under the least pressure, venting to the exterior through the airing orifice 65 any excess pressure generated by temperature excess in the bearing 17 cavities, but which, in the other direction, blocks the entry of water and dust to this cavity 17. It has been found that this seal should be less stiff than the primary, double lip type seal 57, to avoid excessive rise of the temperature in the bearing cavity 17 before excess air pressure is released to the exterior.

The internal end of stem 49 of the coupling 25 includes teeth 69 for axial connection to pipe sections 23. This flexible connection allows for eccentricity tolerances and axial misalignments in the mounting of coupling 25 relative to the wheel's axle 11.

Additionally, the stem 49 is mounted so it can displace axially inside body 35–37, which allows for the detection of wearing or loose elements of the wheel, in the following way. The block 35 is fixed to the wheel center's cover by means of the thread 41. This thread 41 is relative extensive and is made to continue through a tubular extension 71 to receive also a counternut 73 to calibrate the axial position of stem 49 so that its end fits into bushing 47. In the event of the existence of play in the wheel, it will move outwards and, when the wear reaches certain magnitude, the end of stem 49 leads into the gap 63 between both seals 57 and 67, forcing the pressurized air from the pipe 22 releases to the exterior, informing the driver to verify to check if tire is punctured or bearing is defective.

This same method of detection of faults signals the end of the useful life of the primary seal 57, because as its lips wear, air is allowed again through opening 65, without affecting, on another aspect, the lubrication of the bearings 17.

Various modifications, variations and/or additions can be made to the embodiment described herein, within the scope and spirit of the invention.

We claim:

1. A rotary coupling for one or more wheels mounted to an axle end of a vehicle, for communicating at least one wheel tire to an air-pressure control arrangement installed on the vehicle and comprising:

(a) a body mounted to the wheel, said body having an inside wherein a pressurized air chamber is formed and having at least one orifice formed in said body for communicating said chamber to said tire(s);

(b) a rotary stem extending inside said body and axially traversed by a conduit opening out into said chamber, said stem having an end projecting from said body for operatively connecting said conduit to said air-pressure control system; and (c) a rotary seal housed in said body and said rotary stem to normally block pressurized air from escaping from said chamber in communication with said axial conduit, wherein said projected end of the stem is provided with a connection device to a pressurized air passage passing inside said vehicle axle for communicating said chamber through said conduit to said pressure control system, said coupling further including a vent opening on the opposite side of said seal from said chamber, and wherein the internal end of said stem is supported by a bushing seated on said body, said bushing formed with at least one passage providing communication between said chamber and said at least one orifice.

2. A rotary pneumatic coupling according to claim 1, wherein said coupling stem projected end is formed as an axial connection device for connection to the end of the vehicle axle.

3. A rotary pneumatic coupling according to claim 1, wherein said bushing is a plastics bushing.

4. A rotary pneumatic coupling according to claim 1, wherein said bushing has an external surface and said at least one passage comprises grooves formed on the external surface of said bushing.

5. A rotary pneumatic coupling according to claim 1, wherein said bushing comprises a circumferential skirt supporting a primary seal bearing against a washer.

6. A rotary pneumatic coupling according to claim 5, wherein said washer includes radial grooves opening out to a gap defined between the side of said washer opposite to said seal and a secondary seal arranged between said body and said coupling stem, said gap opening towards said airing orifice.

7. A rotary pneumatic coupling according to claim 6, wherein said body comprises:
   (i) a block housing said secondary seal and provided with means for attachment to said wheel and
   (ii) a cover affixed to said block and housing said bushing, said primary seal and said washer, with said gap defined between said block and said cover.

8. A rotary pneumatic coupling according to claim 7, wherein said cover has a cup-shaped portion with an edge defining a seat for said bushing and an inside defining said chamber.

9. A rotary pneumatic coupling according to claim 1, wherein said stem is slidably mounted in the axial direction inside said body.

10. A method for detecting a faulty bearing in a wheel equipped with a rotary pneumatic coupling comprising (a) a body mounted to the wheel and having an inside wherein a pressurized air chamber is formed in communication with at least one orifice formed in said body with said tire(s); (b) a rotary stem inside said body and axially traversed by a conduit opening out into said cavity, said coupling stem having an end projecting from said body for operatively connecting said conduit to said air-pressure control system; and (c) a rotary seal housed in said body and said rotary coupling stem to normally block pressurized air from escaping from said chamber in communication with said axial conduit axial, wherein said projected end of the coupling stem is provided with a connection device to a pressurized air passage passing inside said vehicle axle for communicating said chamber through said conduit to said pressure control system, said coupling further including an airing opening on the opposite side of said seal from said cavity; said method comprising slidably mounting the stem in the coupling body and detecting a pressurized air leak through said airing orifice due to wear, breakage or fault in the bearings mounting the wheel to a vehicle axle sufficient to cause a substantial displacement of said stem.

11. In an air pressure control system installed in a vehicle, for supplying air from a pressurized air source installed in a static part of the vehicle to one or more tires mounted on rotary wheels on each end of a substantially hollow axle of the vehicle, the combination of an air pipe member extending through said hollow axle towards each of said ends thereof and a rotary pneumatic coupling mounted to the end of an axle mounting said wheel(s) for communicating pressurized air between the static part of the installation and said tire(s); wherein said pipe member includes a flexible pipe section axially connecting it to the rotary coupling; and said rotary coupling comprises:
   a body mounted to the wheel and having an inside wherein a pressurized air cavity is formed in communication with at least one orifice formed in said body with said tire(s),
   a rotary stem inside said body and axially traversed by a conduit opening out into said cavity, said stem having an end projecting from said body provided with a connection device to a pressurized air passage passing inside said vehicle axle for operatively connecting said conduit to said pipe member,
   a rotary seal housed in said body and said rotary stem to normally block pressurized air from escaping from said cavity in communication with said axial conduit axial, and
   a vent opening on the opposite side of said seal from said cavity.

\* \* \* \* \*